No. 784,384. PATENTED MAR. 7, 1905.
M. & E. G. CLARK.
SPOOL FOR MUSICAL INSTRUMENT CONTROLLING SHEETS.
APPLICATION FILED OCT. 22, 1904.

Witnesses:
H. S. Gaither
Fred G. Fischer.

Inventors:
Ernest G. Clark
Melville Clark
by Burton & Burton
their Attorneys

No. 784,384.

Patented March 7, 1905.

UNITED STATES PATENT OFFICE.

MELVILLE CLARK AND ERNEST G. CLARK, OF CHICAGO, ILLINOIS.

SPOOL FOR MUSICAL-INSTRUMENT-CONTROLLING SHEETS.

SPECIFICATION forming part of Letters Patent No. 784,384, dated March 7, 1905.

Application filed October 22, 1904. Serial No. 229,558.

*To all whom it may concern:*

Be it known that we, MELVILLE CLARK and ERNEST G. CLARK, citizens of the United States, residing at Chicago, in the county of Cook and State of Illinois, have invented new and useful Improvements in Spools for Musical-Instrument-Controlling Sheets, of which the following is a specification, reference being made to the accompanying drawings, forming a part thereof.

The purpose of this invention is to provide an improved spool for carrying the perforated controlling-sheet of an automatic musical instrument, one leading purpose of the invention being to make a more satisfactory spool for that purpose having the heads or flanges detachable, so that the different sheets for different pieces of music will be mounted permanently only on the spool body or shaft, the heads or flanges being applied when the spool is put in service in the instrument, so that the expense of the heads or spools will not be involved in preparing the rolls for market, only one pair of heads or flanges being needed with each instrument instead of with each controlling-sheet.

The invention consists in the features of construction set out in the claims.

Figure 1:
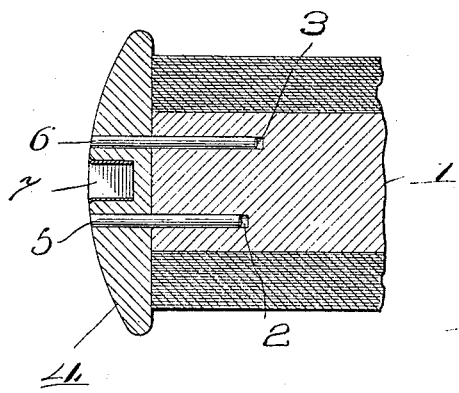
Figure 3:
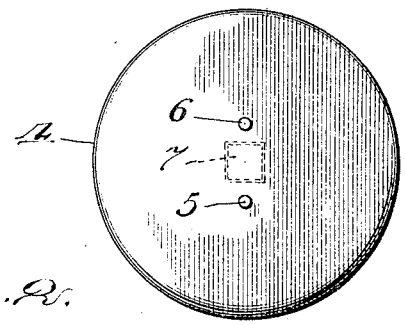
Figure 2:
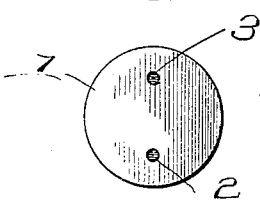
Figure 4:
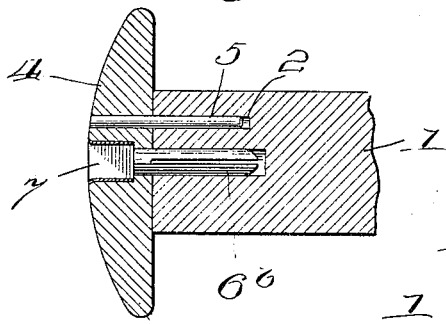
Figure 6:
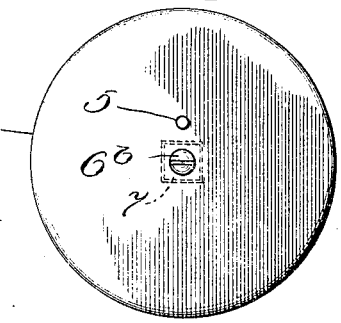
Figure 5:
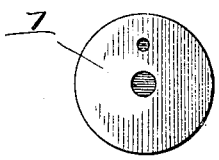
Figure 7:
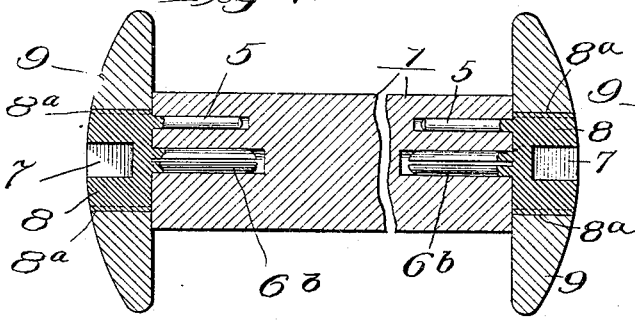
Figure 8:
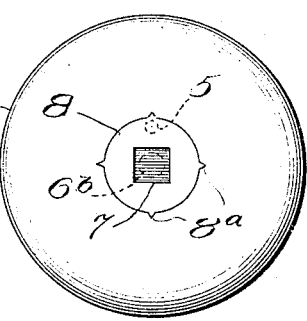

In the drawings, Figure 1 is an axial section of a spool embodying the present invention. Fig. 2 is an end view of the shaft with the head or flange removed. Fig. 3 is an inner face view of the removed head or flange. Fig. 4 is a section of one end of a spool having a modified position of the engaged devices. Figs. 5 and 6 are views similar to Figs. 2 and 3 of the form shown in Fig. 4. Fig. 7 is a detail section of a spool, showing another modification in the form of the connecting devices. Fig. 8 is an end elevation of the spool shown in Fig. 7.

In this spool the shaft or barrel 1 of the spool has two holes 2 and 3 drilled into it at the ends, and the head or flange 4 has projecting from its inner flat face two pins or tenons 5 and 6, respectively positioned and otherwise adapted to enter holes 2 and 3, respectively, and when thus entered to hold the flange or head 4 properly conaxial with the shaft or barrel 1. Preferably one of the pins or tenons is shorter than the other, the tenon 5 being so represented in all the figures. The advantage of this is that it is not necessary for the user in putting the parts together to match both tenons to their respective holes simultaneously; but the longer tenon having been entered in its proper hole the parts may be relatively rotated about the pivotal engagement thus effected to bring the other tenon to its hole, which it will enter when it reaches it. On some accounts it is preferable to have one of the tenons axial with respect to both members of the spool, and such arrangement is shown in Figs. 4, 5, and 6, and in this case the centrally-located or axial tenon is preferably the longer of the two, as shown in said figures. One of the two flanges of the spool is necessarily provided with one member of a clutch device for driving the spool, while the other flange or head requires only means for centering the spool on the bearing, so that it may be rotated by the engagement at the driven end. In order that no confusion may arise in applying the two flanges to the spool-shafts in use, it is desirable, if possible, to have the two heads precisely alike, so that either one may serve for the driving-head and either one for the opposite or mere centering-head. This is easily possible when both the driving expedient and the centering expedient of the heads respectively consist of recesses or sockets, for a square recess or socket which is suitable for engagement with a squared spindle or shaft for driving is entirely operative as a centering expedient when the pivot on which the spool is to be thus centered is circular or the diameter of a circle which might be inscribed within a square corresponding to cross-section of a square socket of the head. The preferred construction, therefore, of these detachable heads is that in which each of the heads, both that which is to be the driving-head and that which is to be the centering-head, has a square socket 7 on the outer side—that is, on the side opposite that from which the tenons project. We do not limit ourselves, however, to this particular expedient, although it is, in our judgment, the simplest one which can be adopted for making the two heads alike, notwithstanding their different functions, as above explained, and we do not limit ourselves to making the two heads alike. If in use it should be found that the tenons are liable to become loose in the holes bored for them in the ends of the shaft, so that the heads of the spools are liable to drop off too easily in handling them, thus causing inconvenience, (although this would in no wise interfere with their perfect operativeness in use in the instrument,) one of the tenons may be made in the form of a split pin which would be normally spread enough to require some compression to enter the hole, the end being tapered so that it will be thus compressed in entering, thus affording an elastic grasp on the body of the shaft sufficient to prevent the head from dropping off by its own weight. This construction is shown in Fig. 7, in which one of the tenons is located centrally or axially, as already described in respect to Figs. 4, 5, and 6, and it is preferably this central tenon $6^b$, which is thus split, with capacity for elastic reaction, as described.

One of the advantages of the above-described construction in any of the forms in which it is represented is that one of the heads may yield at its engagement by means of the tenons with the shaft, so as to permit a slight movement axially to accommodate the swelling of the paper, which sometimes occurs from moisture. In practice, of course, the rolls being usually without the heads except when in use on the instrument, if the paper becomes swollen from this cause or any other the amount of such swelling will be indicated by the protrusion of the paper beyond the end of the shaft, and the advantage above stated is operative in that the heads when applied to the rolls engage and fit them properly when pushed up against the ends of the paper, though they may not be up against the ends of the shaft by reason of the paper being swollen beyond the shaft; but if a given roll is left with the head on it when it is put away and the paper becomes swollen the solid roll of paper thus swelling will push the heads off to the extent of such swelling without marring the edge of the paper.

This spool is preferably made as shown in Fig. 7, in which there is a cylindrical metal center 8, having a socket 7 and the tenons 5 and $6^b$, such metal center being driven into a wooden annulus 9, which forms the outer part of the head or flange. This makes a much more substantial structure than can be obtained if the whole head or flange is of wood, because the tenons 5 and 6 being almost necessarily of metal for proper strength cannot be so securely rooted in the wood as is desirable in view of the fact that there is at the center necessarily also the socket 7, leaving a small amount of material to hold the tenons. Obviously the entire head might be of metal, the only objection to that construction being the weight; but by using the metal center 8, making the same practically cylindrical in outline, with a few sharp longitudinal beads or splines $8^a$ for engaging the wood when the metal cylinder is driven into the latter, a very secure and easily-effected joint is made between the joint and metal, the wood being first bored out to the size of the cylindrical metal center, so that in the driving of the latter into the wood the splines only cut their way into the wood at the circumference of such cylindrical aperture.

We claim—

1. A spool for the purpose indicated comprising a shaft and detachable heads or flanges, the shaft having two parallel bores in each end and the flanges having projecting from their inner face studs or pins positioned and fitted to enter said bores respectively, both said heads or flanges having angular sockets in the outer face.

2. A spool for the purpose indicated comprising a shaft and detachable heads or flanges, the two heads or flanges being alike and each having in the outer face an angular socket adapted for driving engagement.

3. A spool for the purpose indicated comprising a shaft and a detachable head or flange having a central metal portion which extends through from inner to outer side thereof, and which has at the outer side one element of a driving-clutch device for rotating the spool and at the inner side one element of the means for detachably connecting it with the spool-shaft.

4. A spool for the purpose indicated comprising a shaft and a detachable head or flange, the shaft having in the end a socket and the head or flange having a metal center portion which extends through from outer to inner side of the head, and has at the outer side one element of a driving-clutch device for rotating the spool and at the inner side a tenon for entering the socket in the shaft.

In testimony whereof we have hereunto set our hands, in the presence of two witnesses, at Chicago, Illinois, this 20th day of October, A. D. 1904.

MELVILLE CLARK.
ERNEST G. CLARK.

In presence of—
 FREDK. G. FISCHER,
 J. S. ABBOTT.